United States Patent
Kamijoh et al.

(10) Patent No.: US 9,866,590 B2
(45) Date of Patent: *Jan. 9, 2018

(54) PROCESSING INFORMATION BASED ON POLICY INFORMATION OF A TARGET USER

(71) Applicant: International Business Machines Corporation, Armonk, NY (US)

(72) Inventors: Kohichi Kamijoh, Tokyo (JP); Takayuki Osogami, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,689

(22) Filed: Jan. 19, 2015

(65) Prior Publication Data

US 2015/0220741 A1 Aug. 6, 2015

(30) Foreign Application Priority Data

Jan. 31, 2014 (JP) .................................. 2014-016330

(51) Int. Cl.
*H04L 29/06* (2006.01)
*G06F 21/60* (2013.01)
(Continued)

(52) U.S. Cl.
CPC ............. *H04L 63/20* (2013.01); *G06F 21/60* (2013.01); *G06F 21/6263* (2013.01); *G06Q 50/01* (2013.01); *H04L 67/10* (2013.01)

(58) Field of Classification Search
CPC ..... G06Q 50/01; G06F 21/6263; G06F 21/60; H04L 67/10; H04L 63/20
(Continued)

(56) References Cited

U.S. PATENT DOCUMENTS 7,716,140 B1 * 5/2010 Nielsen ............... G06F 21/6245
705/319
8,069,467 B1 * 11/2011 Ogilvie ............... H04L 63/0421
713/182

(Continued)

FOREIGN PATENT DOCUMENTS

JP 2004287846 A 10/2004
JP 2005222135 A 8/2005
(Continued)

OTHER PUBLICATIONS

Chakraborty, S., et al, 'Balancing value and risk in information sharing through obfuscation', In Proceedings of the Int. Conf. on Info. Fusion (FUSION), 2012, entire document, http://ieeexplore.ieee.org/stamp/stamp.jsp?arnumber=6290498.*

(Continued)

*Primary Examiner* — Luu Pham
*Assistant Examiner* — Ronald Baum
(74) *Attorney, Agent, or Firm* — Cantor Colburn LLP; David Quinn

(57) ABSTRACT

An information processing apparatus includes a policy acquisition unit configured to acquire a policy on disclosure of information on a target user; a collection unit configured to collect attributes that may be related to the target user from public information disclosed on a network to create an attribute set related to the target user; and a determination unit configured to determine whether or not the attribute set satisfies the policy.

10 Claims, 11 Drawing Sheets

(51) Int. Cl.
  *H04L 29/08* (2006.01)
  *G06Q 50/00* (2012.01)
  *G06F 21/62* (2013.01)
(58) Field of Classification Search
  USPC .................................................. 726/1
  See application file for complete search history.

(56) References Cited

U.S. PATENT DOCUMENTS

| | | | | |
|---|---|---|---|---|
| 8,869,302 B2* | 10/2014 | Tresanti | ................ | G06Q 10/10 709/203 |
| 8,990,586 B2* | 3/2015 | Sharma | ................ | H04W 12/08 379/93.03 |
| 9,015,196 B2* | 4/2015 | Esposito | ................ | G06F 17/30 707/783 |
| 9,021,028 B2* | 4/2015 | Smith | ................ | G06Q 10/107 709/203 |
| 9,361,392 B1* | 6/2016 | Saylor | ................ | G06F 17/3089 |
| 2005/0171832 A1* | 8/2005 | Hull | ................ | H04L 51/32 705/7.29 |
| 2006/0042483 A1* | 3/2006 | Work | ................ | G06Q 10/00 101/91 |
| 2007/0112624 A1* | 5/2007 | Jung | ................ | G06Q 30/02 705/14.36 |
| 2007/0112762 A1* | 5/2007 | Brubaker | ................ | G06Q 30/02 |
| 2007/0192169 A1* | 8/2007 | Herbrich | ................ | G06Q 30/0282 705/347 |
| 2007/0218900 A1* | 9/2007 | Abhyanker | ................ | G06Q 10/087 455/435.1 |
| 2008/0077517 A1* | 3/2008 | Sappington | ................ | G06Q 10/04 705/35 |
| 2008/0168135 A1* | 7/2008 | Redlich | ................ | G06Q 10/10 709/204 |
| 2008/0294018 A1* | 11/2008 | Kurtz | ................ | A61B 5/103 600/301 |
| 2008/0294589 A1* | 11/2008 | Chu | ................ | G06F 21/6245 706/55 |
| 2009/0031232 A1* | 1/2009 | Brezina | ................ | H04M 15/00 715/764 |
| 2009/0070130 A1* | 3/2009 | Sundaresan | ................ | G06Q 50/01 705/319 |
| 2009/0222329 A1* | 9/2009 | Ramer | ................ | G06F 17/30749 705/14.52 |
| 2009/0254971 A1* | 10/2009 | Herz | ................ | G06Q 10/10 726/1 |
| 2009/0327054 A1* | 12/2009 | Yao | ................ | G06Q 30/02 705/12 |
| 2009/0328135 A1* | 12/2009 | Szabo | ................ | G06F 21/10 726/1 |
| 2010/0153453 A1* | 6/2010 | Knowles | ................ | G06F 17/30867 707/784 |
| 2010/0185630 A1* | 7/2010 | Cheng | ................ | G06F 17/30867 707/756 |
| 2010/0274815 A1* | 10/2010 | Vanasco | ................ | G06F 17/30867 707/798 |
| 2010/0306249 A1* | 12/2010 | Hill | ................ | G06F 17/30867 707/769 |
| 2010/0312724 A1* | 12/2010 | Pinckney | ................ | G06N 99/005 706/11 |
| 2011/0178879 A1* | 7/2011 | Tuck | ................ | G01N 33/56977 705/14.73 |
| 2011/0191832 A1* | 8/2011 | Davis | ................ | G06F 21/00 726/5 |
| 2011/0197255 A1* | 8/2011 | DiCrescenzo | ................ | G06F 21/6263 726/1 |
| 2011/0302117 A1* | 12/2011 | Pinckney | ................ | G06Q 30/02 706/12 |
| 2012/0069131 A1* | 3/2012 | Abelow | ................ | G06Q 10/067 348/14.01 |
| 2012/0124052 A1* | 5/2012 | Furey | ................ | G06Q 10/00 707/740 |
| 2012/0150590 A1* | 6/2012 | Liebermann | ................ | G07C 13/00 705/12 |
| 2012/0197896 A1* | 8/2012 | Li | ................ | H04L 29/08072 707/740 |
| 2012/0311657 A1* | 12/2012 | Boldyrev | ................ | H04W 12/02 726/1 |
| 2012/0330869 A1* | 12/2012 | Durham | ................ | G06N 5/022 706/16 |
| 2013/0061288 A1* | 3/2013 | Paim | ................ | G06Q 10/06 726/4 |
| 2013/0124644 A1* | 5/2013 | Hunt | ................ | H04L 51/12 709/206 |
| 2013/0151240 A1* | 6/2013 | Myslinski | ................ | G06F 17/20 704/9 |
| 2013/0173337 A1* | 7/2013 | Evans | ................ | G06Q 30/0201 705/7.29 |
| 2013/0174275 A1* | 7/2013 | Micucci | ................ | H04L 67/1044 726/28 |
| 2013/0298030 A1* | 11/2013 | Nahumi | ................ | H04W 4/04 715/733 |
| 2013/0318347 A1* | 11/2013 | Moffat | ................ | H04L 63/08 713/168 |
| 2014/0007255 A1* | 1/2014 | Altaf | ................ | G06F 21/6245 726/27 |
| 2014/0164365 A1* | 6/2014 | Graham | ................ | G06Q 50/01 707/723 |
| 2014/0195984 A1* | 7/2014 | Aslam | ................ | G06Q 50/265 715/853 |
| 2014/0280952 A1* | 9/2014 | Shear | ................ | H04L 47/70 709/226 |
| 2015/0082448 A1* | 3/2015 | Elovici | ................ | G06Q 10/107 726/26 |
| 2015/0127628 A1* | 5/2015 | Rathod | ................ | H04W 4/206 707/710 |

FOREIGN PATENT DOCUMENTS

| | | |
|---|---|---|
| JP | 2005284353 A | 10/2005 |
| JP | 2006243963 A | 9/2006 |
| JP | 2006309737 A | 11/2006 |
| JP | 2007264730 A | 10/2007 |
| JP | 2009169921 A | 7/2009 |
| JP | 2009181207 A | 8/2009 |
| JP | 2010097336 A | 4/2010 |

OTHER PUBLICATIONS

National Employment Lawyers Association, 'Social Media, Employer Surveillance & Employee Privacy', Jun. 25-28, 2014, National Employment Lawyers Association, entire document, http://www.employmentlawtampa.com/wp-content/uploads/sites/733/2015/06/2014_social_media_employer_surveillance_and_employee_privacy_cynthia_sass_nela_06.23.14.pdf.*
Y. Ichifuji and N. Sonehara, "Credibility Estimation of Web/SNS Site Using Privacy Policy", The Institute of Electronics, Information and Communication Engineers, D, Information and Systems, J96-D(6), Jun. 1, 2013, pp. 1493-1502, English Abstract Only.
Kohichi Kamijoh, "Processing Information Based on Policy Information of a Target User," U.S. Appl. No. 14/747,018, filed Jun. 23, 2015.
List of IBM Patents or Patent Applications Treated as Related; JP920130135US1, Date Filed: Jan. 19, 2015, pp. 1-2.

* cited by examiner

FIG. 4

| | DISCLOSURE LEVEL | TYPE OF ATTRIBUTE | EXAMPLE OF ATTRIBUTE |
|---|---|---|---|
| ADDRESS | BLOCK NUMBER | Address1 | 1-CHOME 1-BAN |
| | CITY, WARD, TOWN, VILLAGE | Address2 | XXX-STREET, YYY-WARD, YOKOHAMA-CITY |
| | PREFECTURE | Address3 | KANAGAWA-KEN |
| | COUNTRY | Address4 | JAPAN |
| NAME | FULL NAME | Name1 | SABURO YAMADA |
| | FAMILY NAME | Name2.1 | YAMADA |
| | FIRST NAME | Name2.2 | SABURO |
| | INITIALS | Name3 | SY |
| NICKNAME | NICKNAME | Nick1 | GEN-SAN |
| AGE | DATE OF BIRTH | Age1 | XX, YY, 1978 |
| | ACTUAL AGE | Age2 | 35 |
| | APPROXIMATE AGE | Age3 | 30'S |
| OCCUPATION | DIVISION NAME | Job1 | DEVELOPMENT DIVISION |
| | COMPANY NAME | Job2 | IBM |
| | CATEGORY OF BUSINESS | Job3 | FOREIGN-OWNED COMPANY |
| OTHER | HOBBY | Hobby1 | FISHING |

FIG. 6
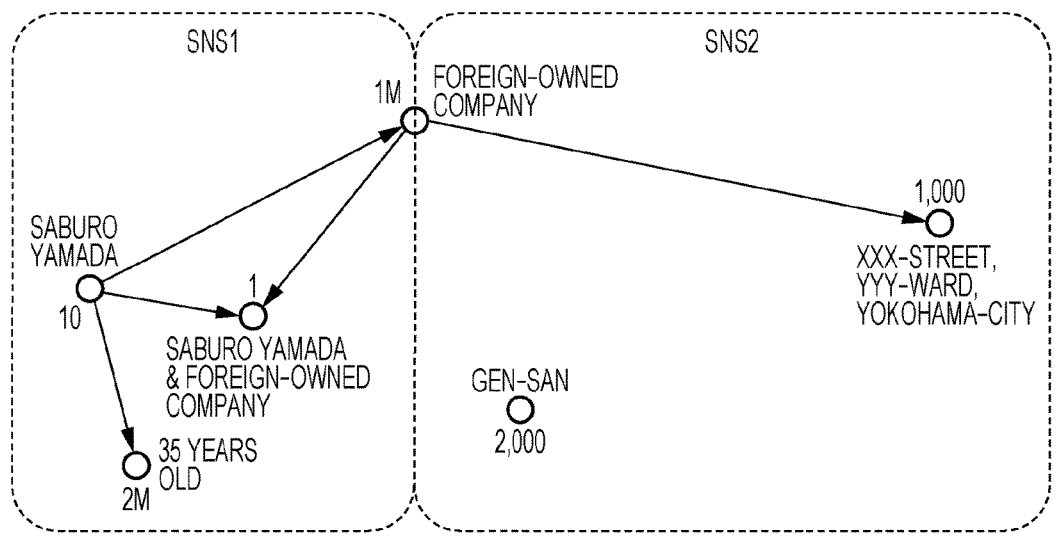
FIG. 7
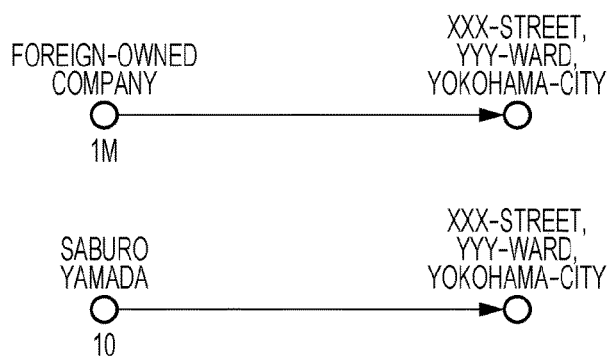

PROCESSING INFORMATION BASED ON POLICY INFORMATION OF A TARGET USER

This application claims priority to Japanese Patent Application No. 2014-016330, filed Jan. 31, 2014, and all the benefits accruing therefrom under 35 U.S.C. §119, the contents of which in its entirety are herein incorporated by reference.

BACKGROUND

The present invention relates to an apparatus, a method, and a program for processing information.

To prevent unintended leakage of personal information in social networking service (SNS), there is a known method for collectively managing a plurality of user IDs or the like (for example, see Patent Literature 1-Japanese Unexamined Patent Application Publication No. 2009-169921). Another known method prevents the leakage of personal information using a privacy policy (Non-patent Literature 1-Y. Ichifuji and N. Sonehara, "Credibility Estimation of Web/SNS Site Using Privacy Policy", The Institute of Electronics, Information and Communication Engineers, D, Information and Systems, J96-D (6), 1493-1502, Jun. 1, 2013).

SUMMARY

In one embodiment, an information processing apparatus includes a policy acquisition unit configured to acquire a policy on disclosure of information on a target user; a collection unit configured to collect attributes that may be related to the target user from public information disclosed on a network to create an attribute set related to the target user; and a determination unit configured to determine whether or not the attribute set satisfies the policy.

In another embodiment, a computer implemented method of executing information processing includes acquiring a policy on disclosure of information on a target user; collecting attributes that may be related to the target user from public information disclosed on a network to create an attribute set related to the target user; and determining whether or not the attribute set satisfies the policy.

In another embodiment, a computer readable storage medium having computer readable instructions stored thereon that, when executed by a computer implement a method of executing information processing, the method including acquiring a policy on disclosure of information on a target user; collecting attributes that may be related to the target user from public information disclosed on a network to create an attribute set related to the target user; and determining whether or not the attribute set satisfies the policy.

BRIEF DESCRIPTION OF THE DRAWINGS

FIG. 4 is a diagram showing an example of attributes included in public information that the collection unit collects.

FIG. 6 is a diagram showing a specific example of the operation of the information processing apparatus according to an embodiment.

FIG. 7 is a diagram showing an example of a process performed by a determination unit for the attribute set in FIG. 6.

DETAILED DESCRIPTION

With respect to the above, it is possible that personal information is presumed from public information on networks, such as a plurality of SNSs managed by an identical person and other person's SNSs.

Accordingly, embodiments of the present invention provide an information processing apparatus including a policy acquisition unit configured to acquire a policy on disclosure of information on a target user, a collection unit configured to collect attributes that may be related to the target user from public information disclosed on a network to create an attribute set related to the target user, and a determination unit configured to determine whether or not the attribute set satisfies the policy, a method for processing information using the information processing apparatus, and a program for operating the information processing apparatus.

Note that the outline of the present invention embodiments described above does not include all necessary features of the present invention and that a sub-combination of these features can also be the present invention.

Although the present invention will be described hereinbelow based on the embodiment, it is to be understood that the embodiment does not limit the scope of claims of the present invention. Not all combinations of features described in the embodiment are absolutely necessary for the solutions of the present invention.

Figure 1:
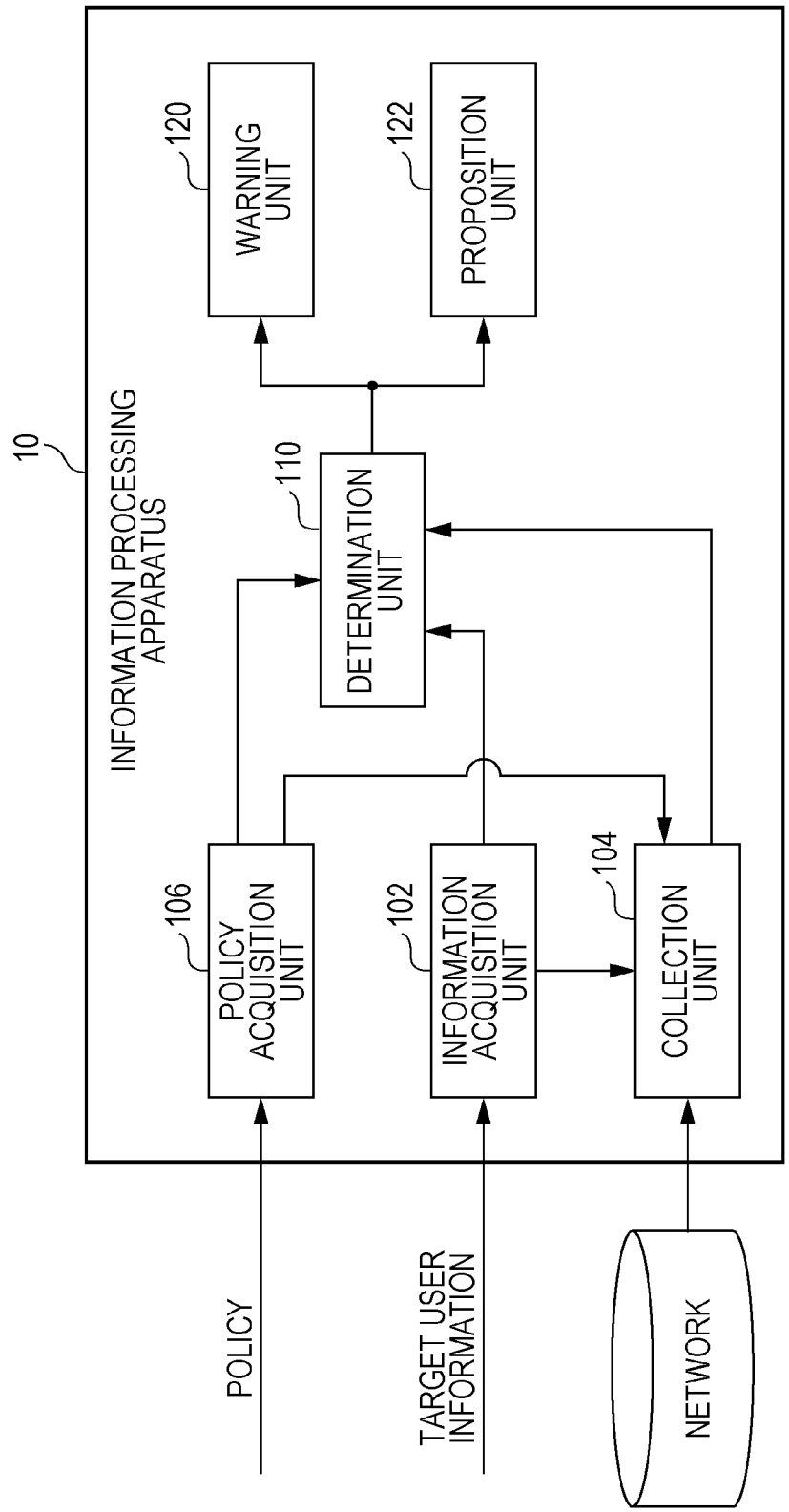
FIG. 1 is a diagram showing the configuration of an information processing apparatus according to an embodiment.

FIG. 1 illustrates the configuration of an information processing apparatus 10 according to the embodiment. The information processing apparatus 10 collects information on a target user from public information on a network and determines whether or not a policy on disclosure of information on the target user is satisfied from the collected public information. The information processing apparatus 10 includes an information acquisition unit 102, a collection unit 104, a policy acquisition unit 106, a determination unit 110, a warning unit 120, and a proposition unit 122.

The information acquisition unit 102 acquires information on the target user from the target user. For example, the information acquisition unit 102 acquires information on the target user disclosed in an SNS or the like on a network and/or new information that the target user intends to disclose on a network. The information acquisition unit 102 sends the acquired information to the collection unit 104 and the determination unit 110.

The collection unit 104 collects attributes that may be related to the target user from information disclosed in an SNS or the like on the network to create an attribute set related to the target user. The collection unit 104 may extract, as the attributes, personal information for use in identifying the user that the information indicates, such as the address, name, nickname, age, and/or occupation.

For example, the collection unit 104 extracts attributes from public information on the target user acquired from the information acquisition unit 102 and further collects attributes that are directly and indirectly related to the extracted attributes from other public information to create an attribute set on the target user. The collection unit 104 sends the created attribute set to the determination unit 110.

The policy acquisition unit 106 acquires policies on disclosure of information on the target user. For example, the policy acquisition unit 106 acquires a policy of prohibiting disclosure of an attribute or a combination of two or more attributes whose disclosure is prohibited. The policy acquisition unit 106 sends the acquired policies to the collection unit 104 and the determination unit 110.

The determination unit 110 determines whether or not the attribute set that the collection unit 104 collected satisfies the policies that the policy acquisition unit 106 acquired. For example, the determination unit 110 determines whether or not a combination of two or more attributes whose disclosure is prohibited by a policy is disclosed in an identifiable state. The determination unit 110 may determine whether or not there is a contradiction between the policies that the policy acquisition unit 106 acquired. The determination unit 110 sends the determination result to the warning unit 120 and the proposition unit 122.

The warning unit 120 gives a warning when the determination unit 110 determines that the policies are not satisfied. The warning unit 120 may give a warning when the policies that the policy acquisition unit 106 acquired have a contradiction.

If the determination unit 110 determines that the policies are not satisfied, the proposition unit 122 proposes correction of the public information and/or new information to be disclosed.

In this way, the information processing apparatus 10 collects attributes related to the target user from information disclosed on a network to create an attribute set, and if the attribute set does not satisfy policies, proposes correction of the public information. This allows the information processing apparatus 10 to prevent information on the target user from being unintentionally disclosed.

Figure 2:
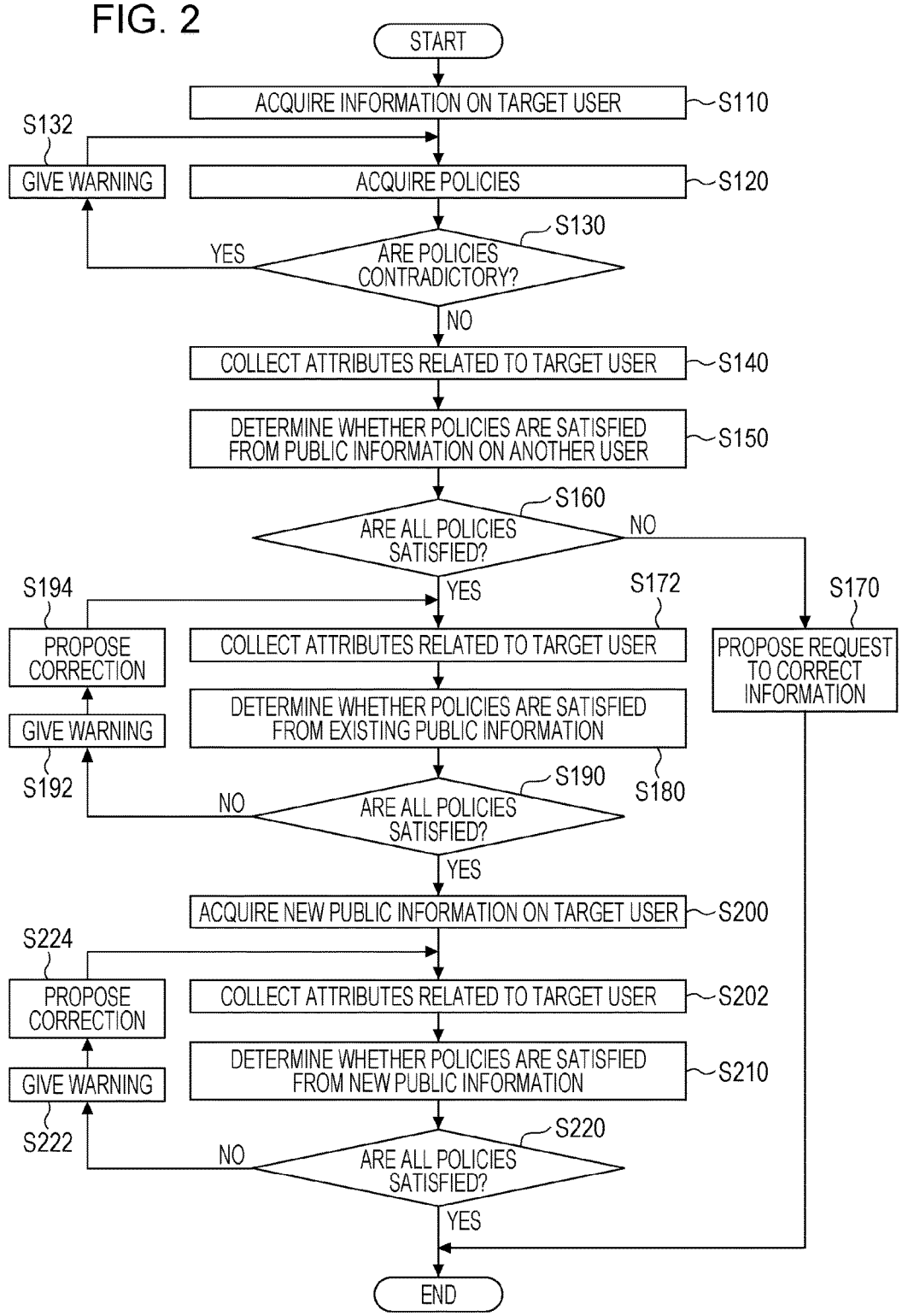
FIG. 2 is a flowchart for the process of the information processing apparatus according to an embodiment.

FIG. 2 shows a flowchart for the process of the information processing apparatus 10 of this embodiment. In this embodiment, the information processing apparatus 10 executes the process from S110 to S224.

First, in S110, the information acquisition unit 102 acquires information on the target user. For example, the information acquisition unit 102 acquires information on the target user disclosed in one or a plurality of SNSs. Alternatively, the information acquisition unit 102 may acquire public name, such as ID, disclosed in an SNS or the like from the target user and may acquire public information in the SNS or the like on the target user from the public name. Furthermore, the information acquisition unit 102 may acquire profile information including a correct attribute of the target user that the target user discloses or does not disclose in the SNS.

The information acquisition unit 102 may acquire information on a user who operates the information processing apparatus 10 as information on the target user, or alternatively, may acquire information on another user different from the user who operates the information processing apparatus 10. The information acquisition unit 102 sends the acquired information to the collection unit 104 and the determination unit 110.

Next, in S120, the policy acquisition unit 106 acquires policies on disclosure of information on the target user. For example, the policy acquisition unit 106 acquires a policy of prohibiting disclosure of an attribute or a combination of two or more attributes whose disclosure is prohibited (P_prohibit). As an example, the policy acquisition unit 106 may acquire a policy of prohibiting disclosure of a combination of attributes, "name" and "address" (P_prohibit=(Name1 & Address1)).

As another example, the policy acquisition unit 106 acquires a policy of allowing disclosure of a false attribute or a combination of attributes including a false attribute (P_allow). As an example, the policy acquisition unit 106 may acquire a policy of allowing disclosure of a combination of "name" and false "age" (P_allow=Name1 & false (Age1)).

As further example, the policy acquisition unit 106 may acquire a policy of prohibiting disclosure of a combination with a false attribute (P_must). As an example, the policy acquisition unit 106 may acquire a policy of prohibiting disclosure of a combination of "name" and false "address" (P_must=Name1 & Address1).

In addition to or instead of acquiring a new policy on disclosure of information, the policy acquisition unit 106 may acquire a preset policy, such as a default policy that any user can use, as a policy on disclosure of information. For example, the policy acquisition unit 106 may acquire a policy of prohibiting disclosure or a combination of "name" and "address" of the target user and a combination of "name" and "place of work" as a default policy. The policy acquisition unit 106 sends the acquired policies to the collection unit 104 and the determination unit 110.

Next, in S130, the determination unit 110 determines whether or not the policies that the policy acquisition unit 106 acquired have a contradiction. For example, if there is no attribute that satisfies both P_must and P_allow, the determination unit 110 may determine that the policies have a contradiction. For example, if P_must=Name1 & Address1 and P_allow=Name1 & false (Address1) are acquired, the determination unit 110 determines that there is no attribute that satisfies both the two policies and that the policies have a contradiction. If the determination unit 110 finds a contradiction between the acquired policies, the determination unit 110 advances the process to S132, if not, advances the process to S140.

In S132, the warning unit 120 makes a warning that the policies have a contradiction be displayed on a display or the like of the information processing apparatus 10 to prompt correction of the policies. Thereafter, the warning unit 120 advances the process to S120, where the policy acquisition unit 106 acquires policies again.

In S140, the collection unit 104 collects attributes that may be directly or indirectly related to the target user from public information on the network excluding the public information on the target user acquired in S110 to create an attribute set related to the target user. For example, the collection unit 104 collects information, such as address, name, nickname, age, and/or occupation, as attributes.

For example, the collection unit 104 collects a combination of attributes whose disclosure is prohibited by the policy (P_prohibit) and attributes in a path associating one attribute to another attribute in the combination.

The collection unit 104 may create a combination of attributes (for example, "name & address") from a plurality of attributes and may put the created combination of attributes in an attribute set as one attribute. A specific method for the collection unit 104 to create the attribute set will be described later.

Here, the collection unit 104 calculates a score indicating the degree of difficulty in identifying the target user in association with an attribute included in the public information. For example, the collection unit 104 acquires information on the number and/or proportion of persons having the attribute from an external database to calculate the number or proportion of persons having the attribute as a score corresponding to the attribute. Alternatively, the collection unit 104 may search for users having the attribute on an SNS and use the found number of users as a score.

As an example, for an attribute "Saburo Yamada", the collection unit 104 may calculate, as the score of the attribute "Saburo Yamada", the number of persons whose name is identified as/presumed to be "Saburo Yamada" (for example, 10) in Japan from a database or the like. In another example, for an attribute "foreign-owned company", the collection unit 104 may calculate, as the score of the attribute "foreign-owned company", the number of persons whose place of work is identified as/presumed to be "foreign-owned company" (for example, a million).

Furthermore, the collection unit 104 may calculate also the score of a combination of attributes. As an example, for an attribute "Saburo Yamada & foreign-owned company", the collection unit 104 may calculate, as the score of the attribute "Saburo Yamada & foreign-owned company", the number of persons whose name is "Saburo Yamada" and whose place of work is "foreign-owned company" from the sum of the proportions of persons having the individual attributes (for example, [10/one hundred million]×[a million/one hundred million]×one hundred million=0.1). If the calculated score is less than 1, the collection unit 104 may determine the score to be 1.

Next, in S150, the determination unit 110 determines whether or not the attribute set that the collection unit 104 collected satisfies the policies that the policy acquisition unit 106 acquired. For example, the determination unit 110 determines whether or not the attribute set satisfies the policy (P_prohibit) by determining whether or not an attribute or a combination of two or more attributes whose disclosure is prohibited can be derived from the public information on the basis of the score of the attribute.

As an example, if the attribute set does not include an attribute or a combination of two or more attributes whose disclosure is prohibited, the determination unit 110 determines that the attribute set satisfies the policy (P_prohibit).

If the attribute set includes an attribute or a combination of two or more attributes whose disclosure is prohibited, then the determination unit 110 determines whether or not the score of another attribute that is directly associated with the attribute whose disclosure is prohibited in the attribute set is equal to a reference value or less. If the score is equal to the reference value or less, the determination unit 110 determines that the attribute whose disclosure is prohibited is disclosed and does not satisfy the policy (P_prohibit).

The determination unit 110 determines whether or not the attribute set satisfies the policy of allowing disclosure of a false attribute or a combination of attributes including a false attribute (P_allow) by determining whether a false attribute of the target user can be derived from the public information. For example, the determination unit 110 determines whether or not one item of public information includes a false attribute or a combination of attributes including a false attribute other than an attribute or a combination of attributes that the policy (P_allow) allows.

As an example, if one item of public information includes a combination of one correct name and a false address and if the combination is not allowed by the policy (P_allow), the determination unit 110 determines that the policy (P_allow=Name_1 & false (Address_1)) is not satisfied, and if the combination is allowed by the policy (P_allow), the determination unit 110 determines that the policy (P_allow=Name_1 & false (Address_1)) is satisfied.

The determination unit 110 determines whether or not the policy of prohibiting disclosure of a combination with a false attribute (P_must) is satisfied by determining whether a false attribute can be derived from public information on the target user. As an example, if one item of public information includes a combination of correct name and a false address, the determination unit 110 determines that the policy (P_must=Name_1 & Address_1) is not satisfied, and if such public information is not extracted, determines that the policy is satisfied.

Since the collection unit 104 creates an attribute set from public information excluding the public information on the target user in S140, the determination unit 110 determines in S150 whether or not an attribute set that does not include attributes extracted from the public information on the target user satisfies the policy. In other words, the determination unit 110 first determines whether or not the policy on the target user is satisfied from information on another person disclosed in an SNS or the like that the target user cannot manage.

Next, if the determination unit 110 determines in S160 that all policies are satisfied, the determination unit 110 advances the process to S172, if not, the determination unit 110 sends the determination result to the warning unit 120 and the proposition unit 122, and advances the process to S170.

In S170, the proposition unit 122 proposes a request to correct the public information. For example, the proposition unit 122 proposes transmission of a request to correct the public information, which hinders derivation of an attribute whose disclosure is prohibited on the basis of the policy (P_prohibit) to another person.

As an example, the proposition unit 122 may propose transmission of deletion, broader terms, and/or changes in the descriptions of attributes included in a combination of attributes whose disclosure is prohibited by the policy (P_prohibit) and/or attributes included in a path associating one of the attributes of the combination with another attribute to the user who is the manager of public information including the attribute.

The proposition unit 122 may propose a request to correct an attribute in the public information so that the score of another attribute that is directly associated with an attribute whose disclosure is prohibited in the corrected attribute set reaches the reference value or more. The information processing apparatus 10 may terminate the process after S170 or may restart the process from S140.

In S172, the collection unit 104 collects attributes that may be directly or indirectly related to the target user from public information on the network, as in S140, to create an attribute set related to the target user. Here, the collection unit 104 collects attributes also from the public information on the target user acquired in S110.

In S180, the determination unit 110 determines whether or not the attribute set that the collection unit 104 collected satisfies the policies that the policy acquisition unit 106 acquired. The determination unit 110 may execute the determination process as in S150.

Here, the determination unit 110 determines whether or not the attribute set including the attributes extracted from the existing public information on the target user satisfies the policies. In other words, the determination unit 110 determines whether or not the policies on the target user are satisfied on the basis of information on the target user disclosed in an SNS or the like that the target user can manage.

If the determination unit 110 determines in S180 that all the policies are satisfied, then in S190, the determination unit 110 advances the process to S200, and if not, the determination unit 110 sends the determination result to the warning unit 120 and the proposition unit 122 and advances the process to S192.

In S192, the warning unit 120 issues a warning that the public information does not satisfy the policies. For example, the warning unit 120 makes a message that the public information does not satisfy the policies being displayed on a display or the like of the information processing apparatus 10.

Next, in S194, the proposition unit 122 proposes correction of the public information on the target user. For example, the proposition unit 122 proposes disclosing information that hinders deriving an attribute whose disclosure is prohibited on the basis of the policy (P_prohibit).

As an example, the proposition unit 122 may propose deletion, broader terms, and/or changes in the descriptions of attributes included in a combination of attributes whose disclosure is prohibited by the policy (P_prohibit) and/or attributes included in a path associating one of the attributes of the combination with another attribute. For example, the proposition unit 122 may propose correction of an attribute in the public information so that the score of another attribute that is directly associated with an attribute whose disclosure is prohibited in the corrected attribute set reaches the reference value or more.

The proposition unit 122 may propose deletion, broader terms, and/or changes in the descriptions of attributes which are in a path that links a combination of attributes whose disclosure is not allowed by the policy (P_allow) and which are included in the public information on the target user. The proposition unit 122 may propose deletion, broader terms, and/or changes in the descriptions of attributes which are in a path that links a false attribute and a combination of false attributes whose disclosure is prohibited by the policy (P_must) and which are included in the public information on the target user.

In S200, the information acquisition unit 102 acquires new public information that the target user intends to disclose (for example, the URL of an SNS and/or information disclosed in an SNS) and provides the public information to the collection unit 104.

In S202, the collection unit 104 collects attributes that may be directly or indirectly related to the target user from public information on the network, as in S140, to create an attribute set related to the target user. Here, the collection unit 104 collects attributes also from the public information on the target user acquired in S110 and the new public information acquired in S200.

In S210, the determination unit 110 determines whether or not the attribute set that the collection unit 104 collected in S202 satisfies the policies that the policy acquisition unit 106 acquired. Thus, in the case where attributes included in new public information are added to the attribute set, the determination unit 110 determines whether or not the attribute set satisfies the policies. The determination unit 110 may execute the determination process as in S150.

If the determination unit 110 determines in S210 that all the policies are satisfied, then in S220, the determination unit 110 terminates the process, and if not, the determination unit 110 sends the determination result to the warning unit 120 and the proposition unit 122 and advances the process to S222.

In S222, the warning unit 120 issues a warning that the new public information does not satisfy the policies. For example, the warning unit 120 makes a message that the new public information does not satisfy the policies be displayed on a display or the like of the information processing apparatus 10.

Next, in S224, the proposition unit 122 proposes correction of the new public information on the target user. For example, the proposition unit 122 proposes disclosing, in the new public information, information that hinders deriving an attribute whose disclosure is prohibited on the basis of the policy (P_prohibit).

As an example, the proposition unit 122 may propose deletion, broader terms, and/or changes in the descriptions of attributes included in a combination of attributes whose disclosure is prohibited by the policy (P_prohibit) and/or attributes included in a path associating one of the attributes of the combination with another attribute. For example, the proposition unit 122 may propose correction of an attribute in the public information so that the score of another attribute that is directly associated with an attribute whose disclosure is prohibited in the corrected attribute set reaches the reference value or more.

The proposition unit 122 may propose deletion, broader terms, and/or changes in the descriptions of attributes which are in a path that links a combination of attributes whose disclosure is not allowed by the policy (P_allow) and which are included in the new public information. The proposition unit 122 may propose deletion, broader terms, and/or changes in the descriptions of attributes which are in a path that links a false attribute and a combination of false attributes whose disclosure is prohibited by the policy (P_must) and which are included in the new public information.

Thus, the information processing apparatus 10 determines whether or not information on the target user is unintentionally disclosed by collecting attributes related to the target user from information disclosed on the network to create an attribute set and determining whether or not the attribute set satisfies policies. If the policies are not satisfied, the information processing apparatus 10 proposes, for example, a change in the attributes, thereby preventing unintentional disclosure of the information on the target user.

Figure 3:
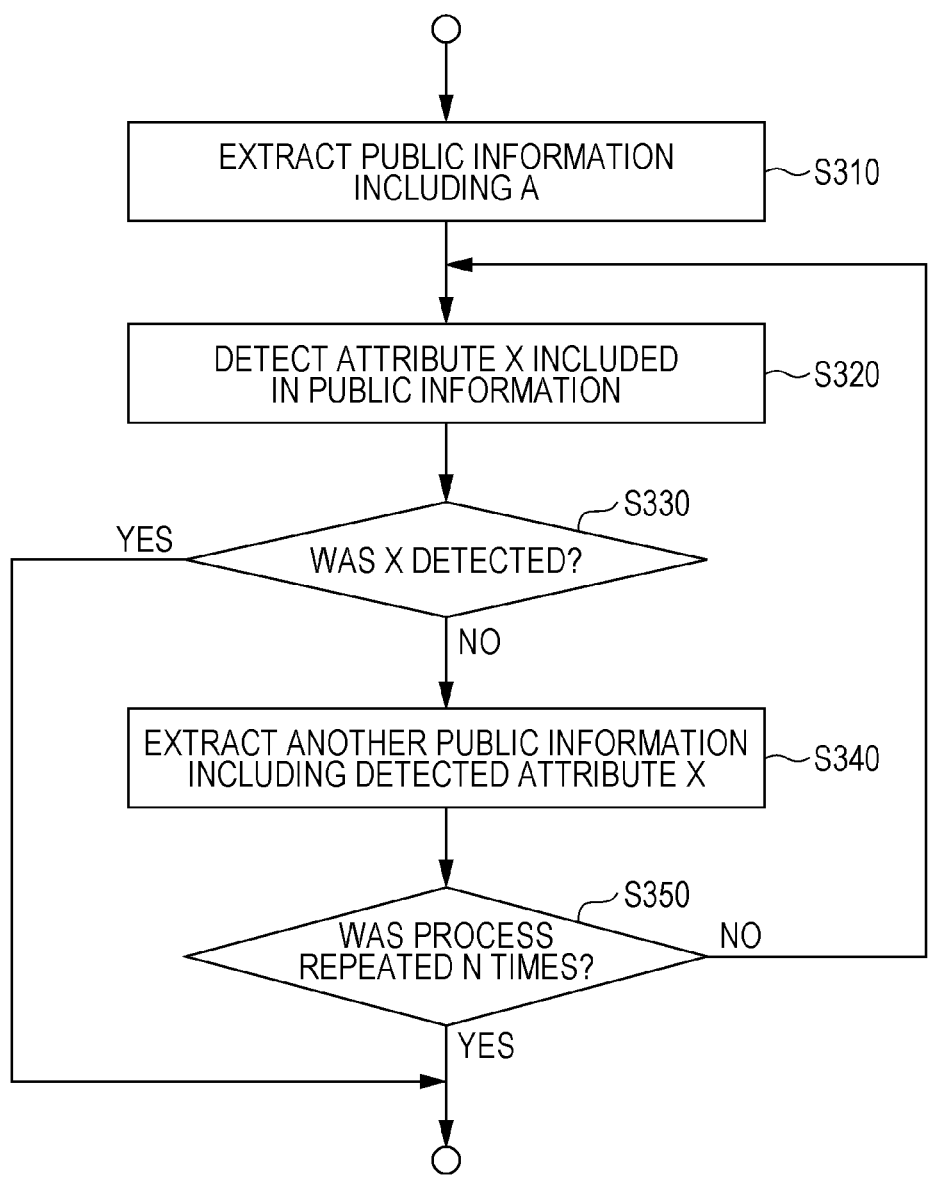
FIG. 3 is a flowchart for the process of a collection unit creating an attribute set in an embodiment.

FIG. 3 is a flowchart for the process of the collection unit 104 creating an attribute set in S140, S172, and S202 of this embodiment. Assume that the collection unit 104 has acquired a policy of prohibiting disclosure of a combination of an attribute A (for example, the name of the target user "Saburo Yamada") and an attribute X (for example, the address of the target user "XXX-street, YYY-ward, Yokohama-city") (P_prohibit=(A & X)) from the policy acquisition unit 106.

First, in S310, the collection unit 104 extracts public information including either the attribute A or the attribute X (here, the attribute A) from target public information. In S172 and S202, the collection unit 104 extracts public information on the target user including the name of the target user "Saburo Yamada" as the public information including the attribute A since public information on the target user is to be collected by the collection unit 104.

If the collection unit 104 cannot extract public information including either the attribute A or the attribute X (for example, the attribute A) from the target public information, the collection unit 104 may extract public information including the other (for example, the attribute X). If the collection unit 104 can extract neither the attribute A nor the attribute X from the target public information, the collection unit 104 may terminate the process of S140, S172, or S202.

Next, in S320, the collection unit 104 collects another attribute (for example, the place of work "foreign-owned company") included in the public information collected in S310. The collection unit 104 creates an attribute set including the collected attribute.

Next, in S330, the collection unit 104 determines whether or not the other of the attributes A and X (here, the attribute X) was detected in S320. If the attribute X is detected, the collection unit 104 terminates the process, and if the attribute X is not detected, the collection unit 104 advances the process to S340.

In S340, the collection unit 104 extracts other public information, on the network, which includes the attribute extracted in S320 and which is associated with the public information on the target user extracted in S310 or S340 in the preceding process, with a degree of accuracy equal to or higher than a predetermined criterion.

For example, the collection unit 104 extracts other public information including a reference number or more of attributes common to attributes included in the attribute set related to the target user. As an example, the collection unit 104 may collect other public information including two or more attributes common to attributes included in the attribute set. This allows the collection unit 104 to acquire public information closely related to the attribute A.

Here, the collection unit 104 may collect other public information on the basis of the score of an attribute included in the attribute set. For example, the collection unit 104 may collect public information in which the maximum value, minimum value, sum, and/or product of the scores of attributes included in common to attributes included in the attribute set is equal to a predetermined reference value or more. In other words, although collecting other public information for an attribute having a high score, such as an attribute "Tokyo" having an extremely large population, may associate attributes having no relation with each other, collecting other public information on the basis of the score allows the collection unit 104 to create an attribute set including closely related attributes.

If other public information including an attribute common to an attribute included in the attribute set contradicts the public information of the attribute included in the attribute set, the collection unit 104 may not collect the other public information. For example, if public information includes an age attribute "35", and other public information includes an age attribute "50", the items of public information are mutually contradictory. Thus, there is no need to collect the other public information.

Alternatively, the collection unit 104 may collect other public information that contradicts public information including an attribute included in an existing attribute set, in which case the collection unit 104 may multiply the score of another attribute associated with an attribute whose disclosure is prohibited by a predetermined factor equal to or greater than 1. This allows the determination unit 110 to determine, if contradictory attributes are associated in the attribute set, that there is a low probability that a combination of prohibited attributes is identified.

Next, in S350, the collection unit 104 determines whether or not the process from S320 to S340 was repeated N times (N is a predetermined natural number, for example, 5). If it is determined that the process was repeated N times, the collection unit 104 terminates the process, and if it is determined that the process was repeated less than N times, the collection unit 104 returns the process to S320. In the next process S320, the collection unit 104 detects another attribute included in the public information added in S340.

In this way, the collection unit 104 executes the process from S320 to S350 to associate attributes that may be related to the target user from public information disclosed on the network one by one, thereby creating an attribute set including a path that links a combination of attributes whose disclosure is prohibited.

The collection unit 104 may adjust the value of the score depending on the length of the path that links a combination of attributes whose disclosure is prohibited (that is, the number of attributes included in the path from one of attributes of the combination to the other). For example, the collection unit 104 may multiply the score that the determination unit 110 uses, that is, the score of another attribute that is directly associated with an attribute whose disclosure is prohibited, by a factor that increases with an increasing length of the path.

FIG. 4 shows an example of attributes included in public information that the collection unit 104 of this embodiment collects. As shown in FIG. 4, the collection unit 104 may collect attributes, such as address, name, nickname, age, occupation, and other user information. The collection unit 104 may acquire the same type of attributes at different disclosure levels.

For example, the collection unit 104 may acquire different levels of address attributes, for example, a block number level (Address1), a city-ward-town-village level (Address2), a prefecture level (Address3), and a country level (Address4).

The collection unit 104 may acquire different levels of name attributes, for example, a full name level (Name1), a family name level (Name2.1), a first name level (Name2.2), and an initial level (Name3). The collection unit 104 may also acquire a nickname attribute (Nick1).

The collection unit 104 may acquire different levels of age attributes, for example, a date-of-birth level (Age1), an actual-age level (Age2), and an approximate-age level (Age3). The collection unit 104 may acquire different levels of occupation attributes, for example, a division level (Job1), a company level (Job2), and a category-of-business level (Job3). The collection unit 104 may also acquire a hobby attribute (Hobby1).

Figure 5:
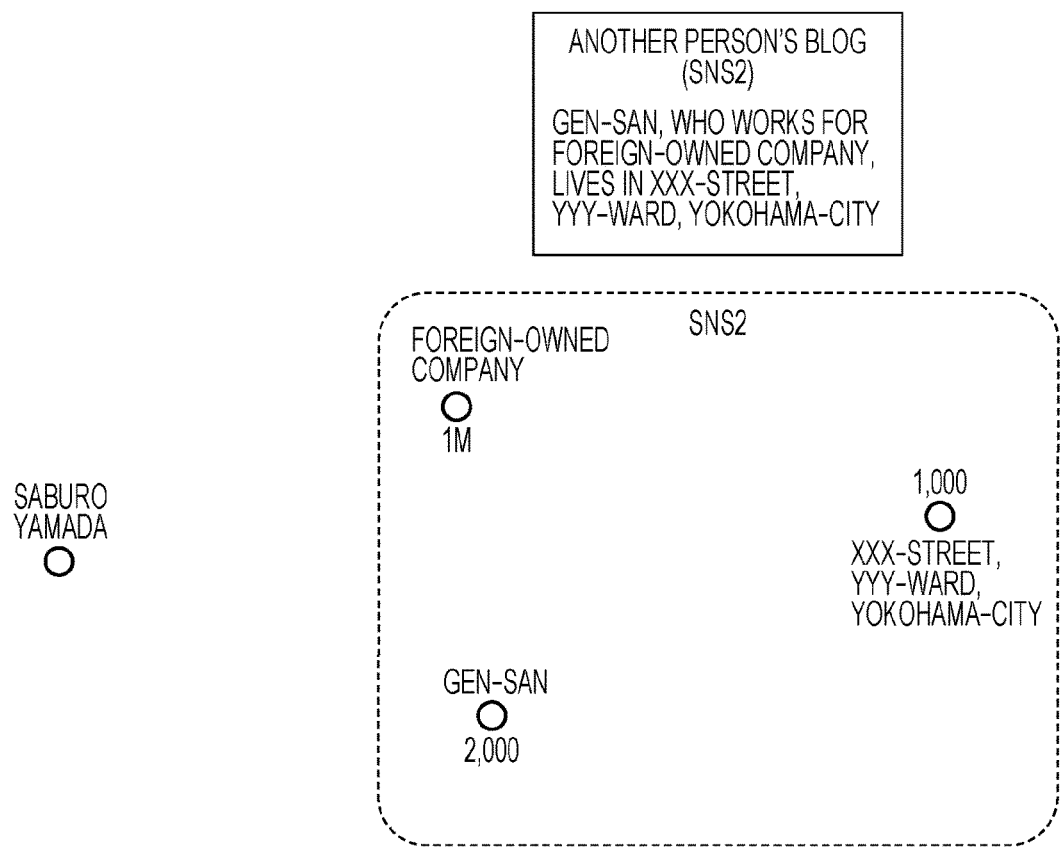
FIG. 5 is a diagram showing a specific example of the operation of the information processing apparatus according to an embodiment.

FIG. 5 shows a specific example of an operation in S120 of the information processing apparatus 10 of this embodiment. In the example of this embodiment, in S120, the policy acquisition unit 106 acquires a policy of prohibiting disclosure of a combination of the name of the target user "Saburo Yamada" and the address of the target user "XXX-street, YYY-ward, Yokohama-city" (P_prohibit=(name & address)).

Since the collection unit 104 does not collect public information on the target user in S310 of S140, the collection unit 104 cannot extract public information including the attribute A (target-user name "Saburo Yamada"). Accordingly, the collection unit 104 extracts public information (SNS2) including the same address "XXX-street, YYY-ward, Yokohama-city" as the address (attribute X) of the target user instead of the attribute A from the target public information.

In S320, the collection unit 104 acquires another attribute "foreign-owned company (the place of work)" and "Gen-san (nickname)" included in the public information (SNS2). The collection unit 104 may create a combination of attributes, such as "foreign-owned company & Gen-san", which is omitted in some of the drawings.

In S340, the collection unit 104 searches for other public information including the attribute "foreign-owned company" and the attribute "Gen-san", but the other public information could not be found in S140. Thus, the collection unit 104 collects a final attribute set of attributes "XXX-street, YYY-ward, Yokohama-city", "foreign-owned company", and "Gen-san". Since this attribute set does not include the target user name "Saburo Yamada", the determination unit 110 determines in S150 that the policy (P_prohibit) is satisfied.

FIG. 6 shows a specific example of an operation in S172 of the information processing apparatus 10 of this embodiment. In this example, in S310 of S172, the collection unit 104 extracts public information (SNS1) including, as the attribute A, the target user name "Saburo Yamada" from target public information, as in FIG. 5. In S320, the collection unit 104 acquires other attributes, for example, "foreign-owned company (place of work)" and "35 years old (age)", included in the public information (SNS1).

In S340, the collection unit 104 searches for other public information including the attribute "foreign-owned company" and the attribute "35 years old" to detect public information (SNS2) including the attribute "foreign-owned company" and associated with the public information (SNS1).

Next, in the second S320 through S350, the collection unit 104 detects the other attributes "XXX-street, YYY-ward, Yokohama-city" and "Gen-san" included in the detected public information (SNS2). Since the attribute "XXX-street, YYY-ward, Yokohama-city" is the other attribute X included in the combination of attributes whose disclosure is prohibited, the collection unit 104 terminates the process of creating an attribute set in S330.

The collection unit 104 calculates the scores of the attributes included in the collected attribute set. For example, the collection unit 104 may calculate a score of 10 for the attribute "Saburo Yamada", a score of one million for the attribute "foreign-owned company", a score of 2,000 for the attribute "Gen-san", and a score of 1,000 for the attribute "XXX-street, YYY-ward, Yokohama-city".

FIG. 7 shows an example of a process performed by the determination unit 110 for the attribute set in FIG. 6. The determination unit 110 determines for the attribute set in FIG. 6 that a path associating a combination of the attribute "Saburo Yamada" and the attribute "XXX-street, YYY-ward, Yokohama-city" whose disclosure is prohibited ("Saburo Yamada"→"foreign-owned company"→"XXX-street, YYY-ward, Yokohama-city") was formed.

Next, the determination unit 110 determines whether or not the score of the attribute ("foreign-owned company") that is directly associated with one attribute ("XXX-street, YYY-ward, Yokohama-city") of the attributes whose disclosure is prohibited is equal to a reference value or less.

For example, if the score of the attribute "foreign-owned company" (one million) is equal to or less than a reference value (for example, 100), which is obtained by multiplying the score (10) of the other attribute ("Saburo Yamada") whose disclosure is prohibited by a predetermined value (for example, 10), the determination unit 110 determines that the attribute set does not satisfy the policy (P_prohibit). In the example of FIG. 6, the determination unit 110 determines that the attribute set satisfies the policy (P_prohibit).

Thus, the determination unit 110 determines the degree of identification of information on a combination of attributes whose disclosure is prohibited, which are indirectly associated by the attribute "foreign-owned company" (for example, a case where "Saburo Yamada lives in XXX-street, YYY-ward, Yokohama-city" is disclosed (the above in FIG. 7), as compared with a case where a combination of attributes whose disclosure is prohibited is directly described in one public information (below in FIG. 7).

Alternatively, the determination unit 110 may use a predetermined value (for example, 10) as the reference value. Since the score of the attribute "foreign-owned company" (one million) is larger than the reference value (10), the determination unit 110 determines in S150 that the attribute set satisfies the policy (P_prohibit).

The degree of difficulty in identification of "foreign-owned company" is one million. Thus, the degree of identification of a user having the attribute ("XXX-street, YYY-ward, Yokohama-city") whose disclosure is prohibited using the attribute ("foreign-owned company") is as few as one millionth. If the degree of identification of the user is less than a submultiple of the reference value (10), the determination unit 110 may determine that the attribute set satisfies the policy (P_prohibit).

Figure 8:
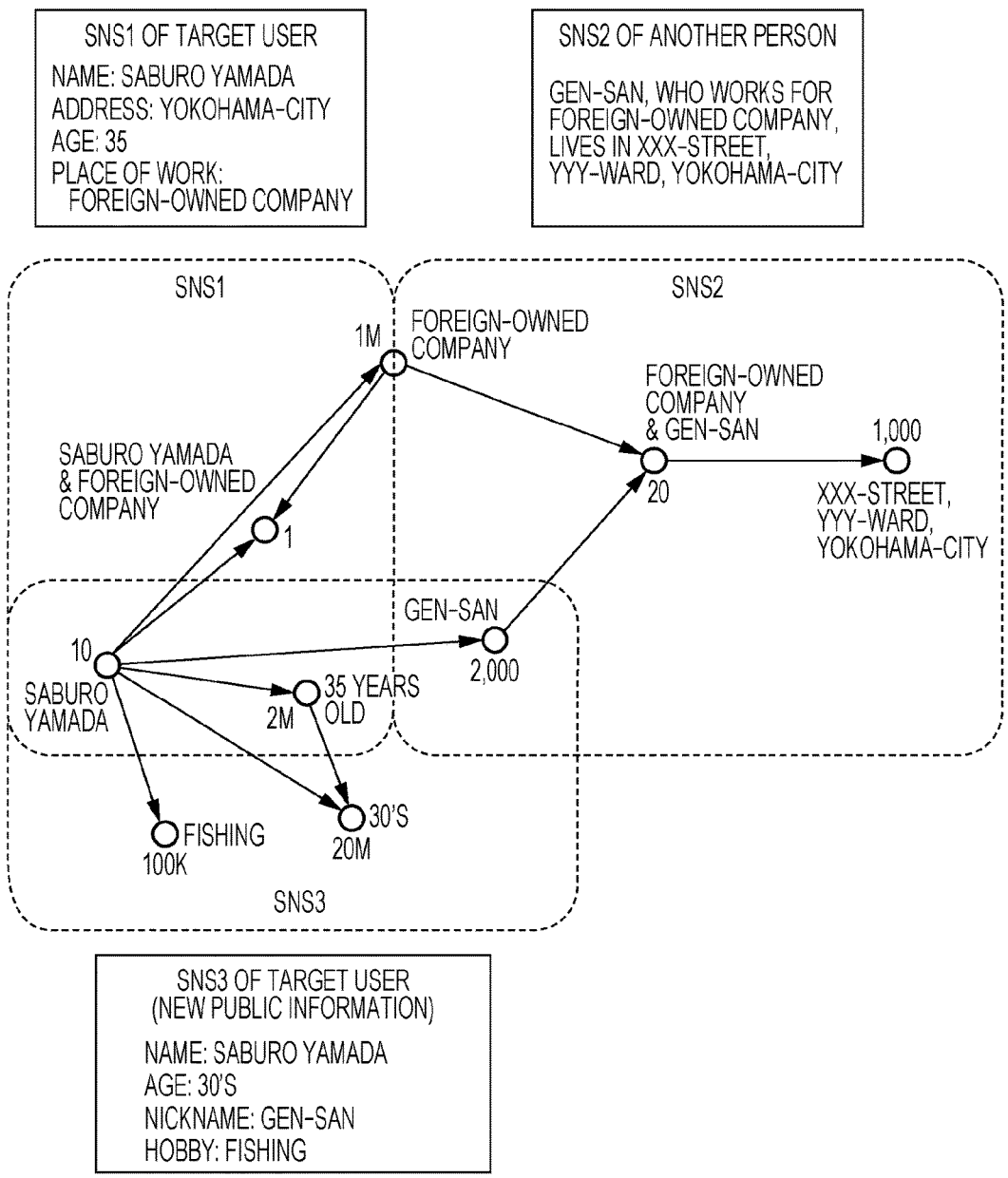
FIG. 8 is a diagram showing a specific example of the operation of the information processing apparatus according to an embodiment.

FIG. 8 shows a specific example of an operation in S202 of the information processing apparatus 10 of this embodiment. In this example, in S310 of S202, the collection unit 104 extracts the public information (SNS1) including, as the attribute A, the target user name "Saburo Yamada" from the target public information, as in FIG. 5. In S320, the collection unit 104 acquires other attributes "foreign-owned company (place of work)" and "35 years old (age)" included in the public information (SNS1).

In S340, the collection unit 104 searches for other public information including the attribute "foreign-owned company" and the attribute "35 years old" to detect public information (SNS2) including the attribute "foreign-owned company" and associated with the public information (SNS1) and new public information (SNS3) including the attribute "Saburo Yamada" and associated with the public information (SNS1).

Next, in the second S320 through S350, the collection unit 104 detects the other attributes "XXX-street, YYY-ward, Yokohama-city", "Gen-san", "30's", and "fishing" included in the detected public information (SNS2) and new public information (SNS3). Since the attribute "XXX-street, YYY-ward, Yokohama-city" is the attribute X included in the combination of attributes whose disclosure is prohibited, the collection unit 104 terminates the process of creating an attribute set in S330.

Figure 9:
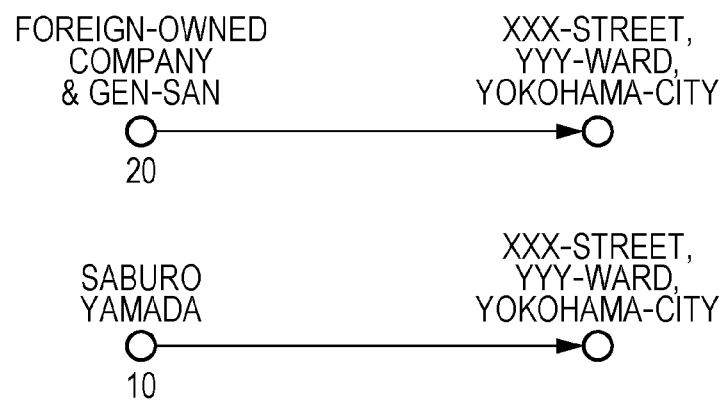
FIG. 9 is a diagram showing an example of a process performed by the determination unit for the attribute set in FIG. 8.

FIG. 9 shows an example of a process performed by the determination unit 110 for the attribute set in FIG. 8. The attribute "Gen-san" is included in common in the two newly detected items of public information (SNS2 and SNS3). Thus, the collection unit 104 associates the two items of public information (SNS2 and SNS3) with each other. As a result, the path from the attribute "Saburo Yamada" to the attribute "XXX-street, YYY-ward, Yokohama-city" is formed not only via the attribute "foreign-owned company" but also via the attribute "Gen-san". Thus, the determination unit 110 determines that a path that associates the combination of the attribute "Saburo Yamada" and the attribute "XXX-street, YYY-ward, Yokohama-city" whose disclosure is prohibited in the attribute set ("Saburo Yamada"→"foreign-owned company" and "Gen-san" "foreign-owned company & Gen-san"→"XXX-street, YYY-ward, Yokohama-city") was formed.

Next, the determination unit 110 determines whether or not the score of the attribute "foreign-owned company & Gen-san" that is directly associated with one attribute ("XXX-street, YYY-ward, Yokohama-city") of the attributes whose disclosure is prohibited is equal to a reference value or less, as in the process in FIG. 7.

For example, if the score of the attribute "foreign-owned company & Gen-san" (20) is equal to or less than a reference value (for example, 100), which is obtained by multiplying the score (10) of the other attribute ("Saburo Yamada") whose disclosure is prohibited by a predetermined value (for example, 10), the determination unit 110 determines that the attribute set does not satisfy the policy (P_prohibit). In the example of FIG. 8, the determination unit 110 determines that the attribute set does not satisfy the policy (P_prohibit).

In other words, the degree of identification of a user having the attribute "foreign-owned company & Gen-san" corresponding to that the place of work is "foreign-owned company" and the nickname is "Gen-san" is about one twentieth, which is substantially the same degree as that of identification of a user having the attribute "Saburo Yamada" (one tenth). Thus, the determination unit 110 determines that the attribute set created from the public information including the new public information (SNS3) does not satisfy the policy (P_prohibit).

Figure 10:
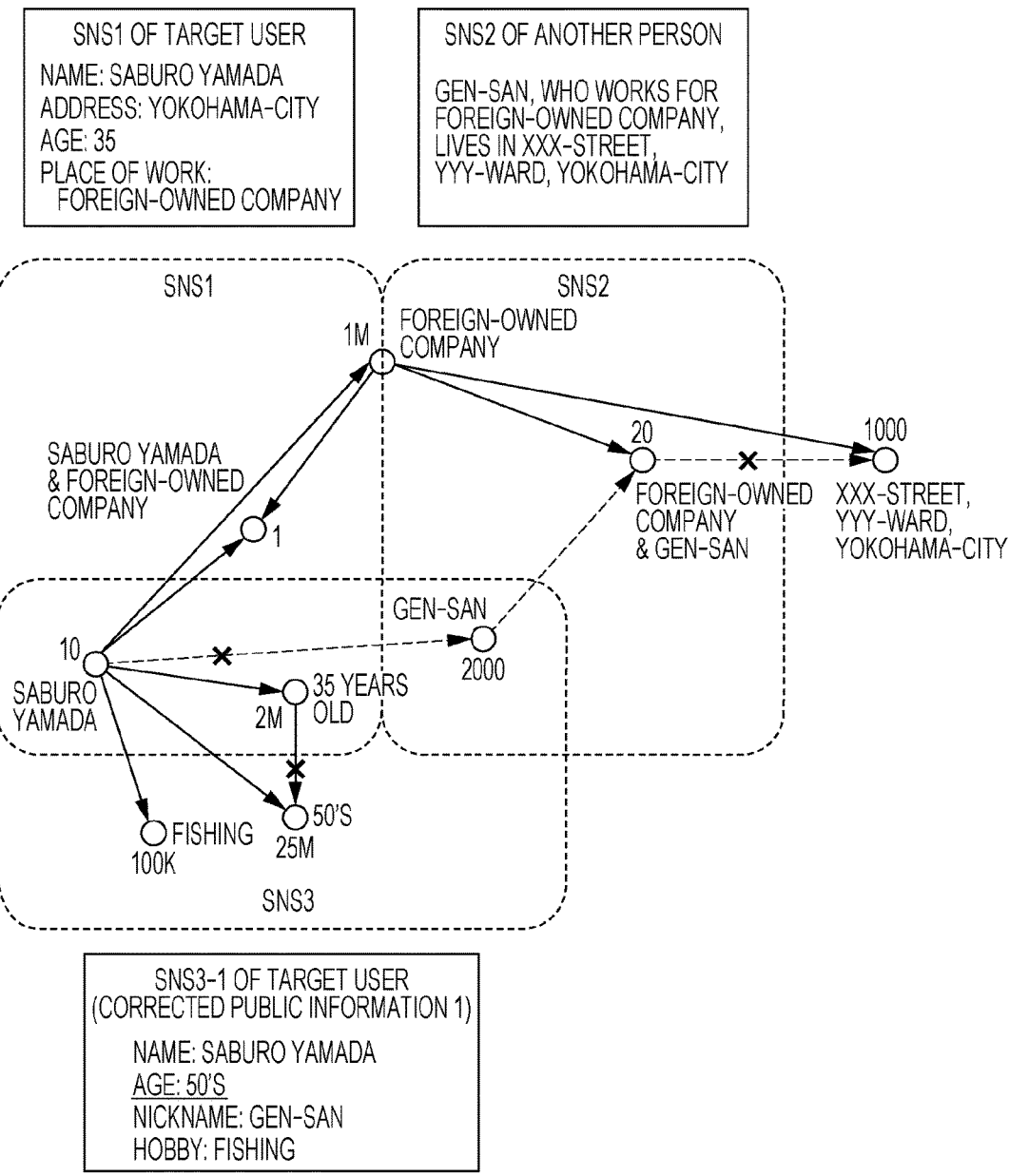
FIG. 10 is a diagram showing a specific example of the operation the information processing apparatus according to an embodiment.

FIG. 10 shows a specific example of operations in S194 and S224 of the information processing apparatus 10 of this embodiment. The proposition unit 122 proposes disclosure of information that hinders deriving an attribute whose disclosure is prohibited on the basis of the policy (P_prohibit).

For example, the proposition unit 122 proposes deleting the description "Gen-san" included in the new public information (SNS3), which forms a path that links the combination of attributes whose disclosure is prohibited ("Saburo Yamada"→"foreign-owned company" and "Gen-san"→"foreign-owned company & Gen-san"→"XXX-street, YYY-ward, Yokohama-city") or correcting the name to another expression that does not derive "Gen-san" (for example, "unique nickname".

In another example, the proposition unit 122 proposes correcting the age attribute "30's" included in the new public information (SNS3), which forms a path that links the combination of attributes whose disclosure is prohibited ("Saburo Yamada"→"foreign-owned company" and "Gen-san"→"foreign-owned company & Gen-san"→"XXX-street, YYY-ward, Yokohama-city") to "50's". Here, the proposition unit 122 may propose changing the age on the condition that disclosure of a false age is allowed by the policy (P_allow).

This causes the public information (SNS1) and the public information (SNS3) to be contradictory, thus making it impossible to presume that "Saburo Yamada" in the public information (SNS1) is "Gen-san" in the public information (SNS3). Thus, the path from the attribute "Saburo Yamada" to the attribute "Gen-san" is cut, and the path from "foreign-owned company & Gen-san" to "XXX-street, YYY-ward, Yokohama-city" is also cut. This increases the degree of identification of the attribute ("XXX-street, YYY-ward, Yokohama-city") whose disclosure is prohibited from the score 20 of the attribute "foreign-owned company & Gen-san" to the score of one million of the attribute "foreign-owned company", thus making it difficult to identify the combination of attributes whose disclosure is prohibited ("Saburo Yamada" and "XXX-street, YYY-ward, Yokohama-city").

Alternatively, the proposition unit 122 may propose correcting another attribute in the public information (SNS3). For example, the proposition unit 122 may propose expressing the name "Saburo Yamada" in the new public information (SNS3) in initials "YS". Alternatively, the proposition unit 122 may propose deleting the nickname "Gen-san".

Figure 11:
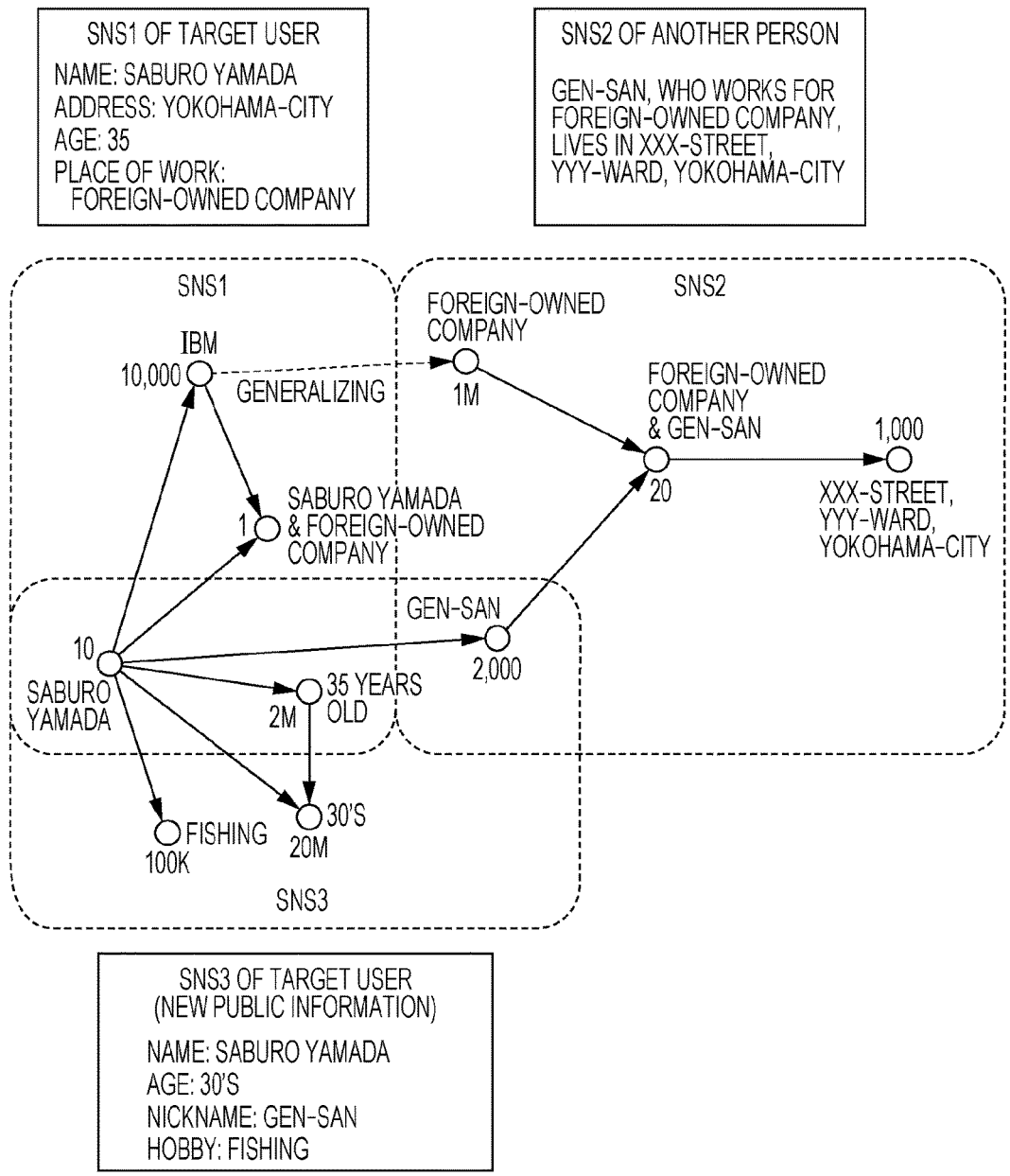
FIG. 11 is a diagram showing a specific example of the operation of the information processing apparatus according to another embodiment.

FIG. 11 is a specific example of the operation of the information processing apparatus 10 according to a modification of this embodiment. In this modification, in S340, the collection unit 104 extracts other public information on the network including not only the attribute detected in S320 but also an attribute in a narrower or broader concept of the attribute detected in S320. The collection unit 104 may acquire an attribute in a narrower or broader concept of the attribute detected in S320 from an external database.

For example, after detecting an attribute "IBM" from the SNS1 in S320, the collection unit 104 searches for other public information including the attribute "IBM" and an attribute corresponding to a generalized concept of the attribute "IBM", such as "foreign-owned company", in S340 to detect public information (SNS2) including the attribute "foreign-owned company". Thus, the collection unit 104 can collect attributes from public information that includes attributes broader and narrower concepts but not completely the same.

Figure 12:
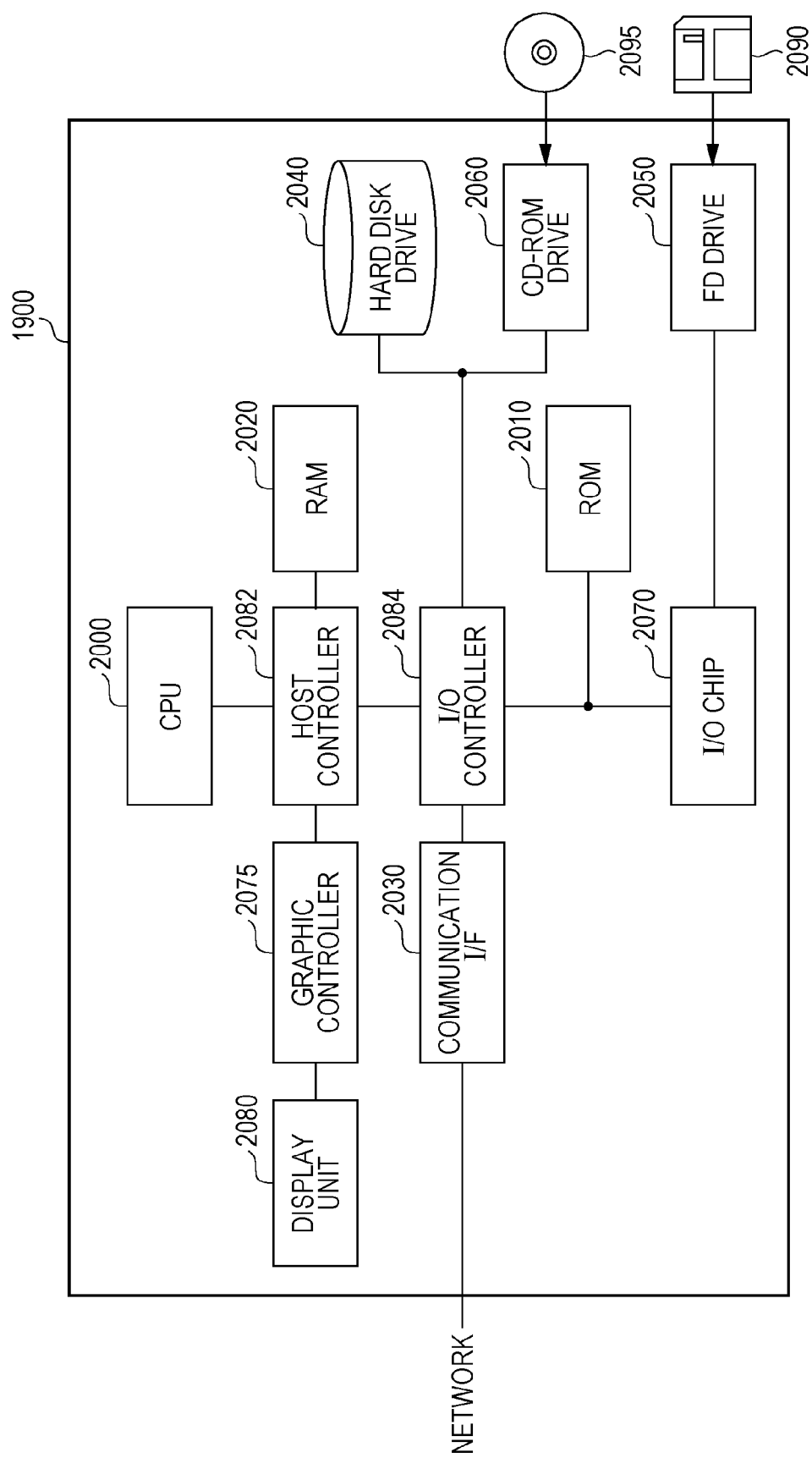
FIG. 12 is a diagram showing an example hardware configuration of a computer.

FIG. 12 illustrates an example hardware configuration of a computer 1900 serving as the information processing apparatus 10. The computer 1900 according to this embodiment includes CPU peripherals including a CPU 2000, a RAM 2020, a graphic controller 2075, and a display unit 2080 which are mutually connected by a host controller 2082; an input/output section including a communication interface 2030, a hard disk drive 2040, and a CD-ROM drive 2060 which are connected to the host controller 2082 by an input/output controller 2084; and a legacy input/output section including a ROM 2010, a flexible disk drive 2050, and an input/output chip 2070 which are connected to the input/output controller 2084.

The host controller 2082 connects the RAM 2020, the CPU 2000 that accesses the RAM 2020 at a high transfer rate, and the graphic controller 2075 together. The CPU 2000 operates on the basis of programs stored in the ROM 2010 and the RAM 2020 to control the components. The graphic controller 2075 acquires image data that the CPU 2000 and so on generate on a frame buffer provided in the RAM 2020 and displays the image data on the display unit 2080. Alternatively, the graphic controller 2075 itself may have a frame buffer that stores image data generated by the CPU 2000 and so on.

The input/output controller 2084 connects the host controller 2082 with the communication interface 2030, the hard disk drive 2040, and the CD-ROM drive 2060, which are relatively high-speed input/output devices. The communication interface 2030 communicates with another device via a network by wire or wirelessly. The communication interface 2030 functions as hardware for communication. The hard disk drive 2040 stores programs and data that the CPU 2000 in the computer 1900 uses. The CD-ROM drive 2060 reads a program or data from a CD-ROM 2095 and provides it to the hard disk drive 2040 via the RAM 2020.

The input/output controller 2084 connects to the ROM 2010, the flexible disk drive 2050, and the input/output chip 2070, which are relatively low-speed input/output devices. The ROM 2010 stores a boot program that the computer 1900 executes at startup and/or programs that depend on the hardware of the computer 1900, and so on. The flexible disk drive 2050 reads a program or data from a flexible disk 2090 and provides it to the hard disk drive 2040 via the RAM 2020. The input/output chip 2070 connects the flexible disk drive 2050 to the input/output controller 2084 and also connects various input-output devices to the input/output controller 2084 via a parallel port, a serial port, a keyboard port, or a mouse port.

A program provided to the hard disk drive 2040 via the RAM 2020 is stored in a storage medium, such as the flexible disk 2090, the CD-ROM 2095, or an IC card, and is provided by a user. The program is read from the storage medium, is installed in the hard disk drive 2040 in the computer 1900 via the RAM 2020, and is executed in the CPU 2000.

The program installed in the computer 1900 for causing the computer 1900 to function as the information processing apparatus 10 includes a dividing module, an automatic recognition module, an edition module, a decision module, an input module, a first integration module, a control module, and a second integration module. These program or modules may work the CPU 2000 and so on so that the computer 1900 functions as an information acquisition module, a collection module, a policy acquisition module, a determination module, a warning module, and a proposition module.

Information processing described in the program is read by the computer 1900 and functions as the information acquisition unit 102, the collection unit 104, the policy acquisition unit 106, the determination unit 110, the warning unit 120, and the proposition unit 122, which are specific means in which software and the various hardware resources described above cooperate. The information processing apparatus 10 suitable for intended use is configured by these specific means implementing calculation or processing of information according to the intended use of the computer 1900 of this embodiment.

As an example, for communication between the computer 1900 and an external device or the like, the CPU 2000 executes a communication program loaded on the RAM 2020 and instructs the communication interface 2030 to perform communication processing based on processing details described in the communication program. The communication interface 2030 reads transmission data stored in a transmission buffer area or the like provided in a storage device, such as the RAM 2020, the hard disk drive 2040, the flexible disk 2090, or the CD-ROM 2095, under the control of the CPU 2000 and transmits the transmission data to a network or writes reception data received from the network to a reception buffer area or the like provided in a storage device. The communication interface 2030 may transfer transmission/reception data to/from a storage device by direct memory access (DMA), as described above. Alternatively, the CPU 2000 may transfer transmission/reception data by reading the data from the source communication interface 2030 or storage device and writing the data to a destination communication interface 2030 or storage device.

Furthermore, the CPU 2000 reads all or necessary part of files or databases stored in external storage devices, such as the hard disk drive 2040, the CD-ROM drive 2060 (CD-ROM 2095), and the flexible disk drive 2050 (flexible disk 2090), into the RAM 2020 by DMA transfer or the like and performs various processes on the data in the RAM 2020. The CPU 2000 writes the processed data back to the external storage devices by DMA transfer or the like. Since the RAM 2020 can be regarded as a temporary storage of the content in the external storage devices in such processes, the RAM 2020 and the external storage devices are collectively referred to as memories, storages, or storage devices in this embodiment.

Various items of information in this embodiment, such as programs, data, tables, and databases, are stored on such storage devices and are subjected to information processing. The CPU 2000 can also store part of the content of the RAM 2020 in a cache memory and can write and read the cache memory. Since the cache memory takes charge of part of the function of the RAM 2020 also in such a configuration, the cache memory is also included in the RAM 2020, the memories, and/or the storage devices in this embodiment except a case where it is distinguished therefrom.

Furthermore, the CPU 2000 performs, on data read from the RAM 2020, various processes including calculation, information processing, determination on conditions, search for information, and replacement of information described in this embodiment, which are designated by an instruction sequence of the program, and writes back the data to the RAM 2020. For example, for the determination on a condition, the CPU 2000 determines whether various variables shown in this embodiment satisfy conditions, such as being larger, smaller, equal to or greater than, equal to or less than, or equal to another variable or constant, and if the condition is satisfied (or not satisfied), the CPU 2000 goes to a different instruction sequence or calls a subroutine.

Furthermore, the CPU 2000 can search for information stored in files, databases, or the like in the storage devices. For example, in the case where a plurality of entries in each of which a second attribute value is associated with a first attribute value are stored in a storage device, the CPU 2000 finds an entry whose first attribute value matches a designated condition from among the plurality of entries stored in the storage device and reads a second attribute value stored in the entry to thereby obtain the second attribute value associated with the first attribute value that satisfies the predetermined condition.

The program or modules described above may be stored in an external recording medium. Examples of the recording medium include optical recording media, such as a DVD and a CD, a magnetooptical recording medium, such as an MO, a tape medium, and a semiconductor memory, such as an IC card, in addition to the flexible disk 2090 and the CD-ROM 2095. The program may be provided to the computer 1900 via a network using a storage device, such as a hard disk and a RAM, provided in a server system connected to a dedicated communication network or the Internet, as a recording medium.

The target user in this embodiment may be either a user who operates the information processing apparatus 10 or another user.

Although the present invention has been described using the embodiment, the technical scope of the present invention is not limited to the scope of the embodiment. It will be obvious to those skilled in the art that various changes and modifications of the embodiment can be made. It will also be obvious from the scope of claims that such changes and modifications are also included in the technical scope of the present invention.

It is to be understood that the processes, such as the operations, procedures, steps, and stages of the devices, systems, programs, and methods shown in Scope of Claims, Description, and drawings, can be achieved in any execution sequence, unless otherwise specified, such as "before" or "prior to", and unless an output of a previous process is used in the following process. Even if operation procedures in Scope of Claims, Description, and the drawings are described using "first", "second", etc. for the purpose of convenience, it is not absolutely necessary to execute the operations in this order.

Reference Signs List
10: information processing apparatus
102: information acquisition unit
104: collection unit
106: policy acquisition unit
110: determination unit
120: warning unit
122: proposition unit
1900: computer
2000: CPU
2010: ROM
2020: RAM
2030: communication interface
2040: hard disk drive
2050: flexible disk drive
2060: CD-ROM drive
2070: input/output chip
2075: graphic controller
2080: display unit
2082: host controller
2084: input/output controller
2090: flexible disk
2095: CD-ROM

The invention claimed is:

1. An information processing apparatus comprising:
a processor coupled to a memory, the processor configured to:
acquire one or more policies on disclosure of information on a target user, wherein at least one of the one or more policies includes a policy of prohibiting disclosure of a first attribute in combination with a second attribute;
collect attributes related to the target user from public information disclosed on two or more networks to create two or more attribute sets related to the target user, wherein the two or more attribute sets include at least a first attribute set and a second attribute set, wherein the first attribute set derives attributes from a first network from the two or more networks, and wherein the second attribute set derives attributes from a second network from the two or more networks;
analyze the two or more attribute sets to determine that the first attribute exists in the first attribute set and the second attribute exists in the second attribute set, wherein the first attribute does not exist in the second attribute set;
determine at least one additional attribute disclosed on the two or more networks, wherein the at least one additional attribute exists in both the first attribute set and the second attribute set;
calculating a score indicating a degree of difficulty in identifying the target user in association with an attribute included in the public information, wherein the score comprises a number of other users having a same attribute as the attribute included in the public information; and
prohibiting disclosure of the first attribute and the second attribute responsive to determining the at least one additional attribute exists and a determination that the score is above a threshold value, wherein the prohibiting includes transmitting a request to remove the at least one additional attribute to a manager of the two or more networks, and
wherein the threshold value is greater than zero.

2. The information processing apparatus according to claim 1, further comprising:
the processor configured to:
acquire new public information that the target user will disclose, wherein a new attribute included in the new public information is added to the two or more attribute sets based upon a determination that the new attribute satisfies the one or more policies.

3. The information processing apparatus according to claim 2, further comprising:
the processor configured to:
determine whether an attribute set satisfies the one or more policies;
based upon a determination the two or more attribute sets do not satisfy the one or more policies, transmitting a request to correct the attribute to a manager of the new public information.

4. The information processing apparatus according to claim 3, wherein the processor proposes disclosing information that prohibits deriving an attribute whose disclosure is prohibited on the basis of the one or more policies, wherein the prohibiting includes transmitting of a request to correct the attribute to a manager of the new public information.

5. The information processing apparatus according to claim 1, wherein the processor creates the two or more attribute sets by collecting attributes in public information on a network, the public information being associated with the public information related to the target user with a degree of accuracy equal to or higher than a predetermined criterion.

6. The information processing apparatus according to claim 5, wherein when a reference number or more of attributes common to attributes included in the two or more attribute sets related to the target user are included, the processor adds another attribute in public information on the network to the two or more attribute sets.

7. The information processing apparatus according to claim 6, wherein the processor collects other public information on the basis of the score of an attribute included in the two or more attribute sets related to the target user.

8. The information processing apparatus according to claim 1 further comprising:
the processor configured to:
acquire a policy of prohibiting disclosure of an attribute or a combination of two or more attributes whose disclosure is prohibited; and
determine whether or not the attribute or the combination of two or more attributes whose disclosure is prohibited can be derived from the public information.

9. The information processing apparatus according to claim 1, further comprising:
the processor configured to:
acquire a policy of allowing disclosure of a misrepresented attribute; and
determine that the misrepresented attribute of the target user can be derived from the public information.

10. A computer program product for executing information processing, the computer program product comprising a computer readable storage medium having program instructions embodied therewith, wherein the computer readable storage medium is not a transitory signal per se, the program instruction executable by a processor to cause the processor to perform a method comprising:

acquiring one or more policies on disclosure of information on a target user, wherein at least one of the one or more policies includes a policy of prohibiting disclosure of a first attribute in combination with a second attribute;

collecting attributes that may be related to the target user from public information disclosed on two or more networks to create two or more attribute sets related to the target user, wherein the two or more attribute sets include at least a first attribute set and a second attribute set, wherein the first attribute set derives attributes from a first network from the two or more networks, and wherein the second attribute set derives attributes from a second network from the two or more networks;

analyzing the two or more attribute sets to determine that the first attribute exists in the first attribute set and the second attribute exists in the second attribute set, wherein the first attribute does not exist in the second attribute set;

determining at least one additional attribute disclosed on the two or more networks, wherein the at least one additional attribute exists in both the first attribute set and the second attribute set, wherein the at least one additional attribute is located on the first network and the second network;

calculating a score indicating a degree of difficulty in identifying the target user in association with an attribute included in the public information, wherein the score comprises a number of other users having a same attribute as the attribute included in the public information; and prohibiting disclosure of the first attribute and the second attribute responsive to determining the at least one additional attribute exists and a determination that the score is above a threshold value, wherein the prohibiting includes transmitting a request to remove the at least one additional attribute to a manager of the two or more networks, and wherein the threshold value is greater than zero.

\* \* \* \* \*